(12) United States Patent
Su

(10) Patent No.: US 9,709,118 B2
(45) Date of Patent: Jul. 18, 2017

(54) ELASTIC MEMBER, AND ELASTIC STRUCTURAL MEMBER CAPABLE OF IMPLEMENTING BEARING CAPABILITY COMBINING RIGIDITY AND FLEXIBILITY

(71) Applicant: SU'S LABORATORY FOR INDUSTRIAL SCIENCE & TECHNOLOGY, Beijing (CN)

(72) Inventor: Zhangren Su, Beijing (CN)

(73) Assignee: SU'S Laboratory for Industrial Science & Technology, Beijing (CN)

( * ) Notice: Subject to any disclaimer, the term of this patent is extended or adjusted under 35 U.S.C. 154(b) by 0 days.

(21) Appl. No.: 14/895,175

(22) PCT Filed: May 22, 2014

(86) PCT No.: PCT/CN2014/078142
§ 371 (c)(1),
(2) Date: Dec. 1, 2015

(87) PCT Pub. No.: WO2014/194762
PCT Pub. Date: Dec. 11, 2014

(65) Prior Publication Data
US 2016/0108983 A1  Apr. 21, 2016

(30) Foreign Application Priority Data
Jun. 2, 2013 (CN) .......................... 2013 1 0212877

(51) Int. Cl.
*B60G 11/34* (2006.01)
*F16F 3/02* (2006.01)
(Continued)

(52) U.S. Cl.
CPC ................ *F16F 3/02* (2013.01); *B65G 19/22* (2013.01); *F16F 1/02* (2013.01); *F16F 1/18* (2013.01); *F16F 3/12* (2013.01); *F41B 5/12* (2013.01)

(58) Field of Classification Search
CPC ........ F16F 3/02; F16F 1/18; F16F 3/12; F16F 1/324; F16F 1/326; F16F 1/02; B65G 19/22; F41B 5/12
(Continued)

(56) References Cited

U.S. PATENT DOCUMENTS

2011/0079944 A1* 4/2011 Akasaka ............... C22C 19/055
267/156
2011/0268376 A1* 11/2011 Shen ....................... F16C 29/02
384/10

FOREIGN PATENT DOCUMENTS

CN       2135081 Y    6/1993
CN       1715700 A    1/2006
(Continued)

OTHER PUBLICATIONS

International Search Report, corresponding to PCT/CN2014/078142, dated Aug. 4, 2014, 6 pages.
(Continued)

*Primary Examiner* — Pamela Rodriguez
(74) *Attorney, Agent, or Firm* — Lewis Roca Rothgerber Christie LLP

(57) ABSTRACT

An elastic member can implement functions of buffering and shock absorption while effectively supporting a vehicle body. On end of the elastic member is turned and bent towards the other end, and passes through the body of the elastic member. The turned and bent part forms a curled portion (3). Portions of the curled portion (3) extending towards two ends form a first arm (1) and a second arm (2). The curled portion (3) pre-stores deformation of a material to integrate an elastic capability of the material and specifically gather a weak elastic capability of a rigid material, thereby obtaining a higher elastic bending moment, and providing functions of buffering and shock absorption while bearing is provided. For a flexible material, the flexible material can be restrained by using the curled portion to increase rigidity and reduce randomness of deformation of the flexible material, thereby combining flexibility and rigidity.

12 Claims, 3 Drawing Sheets

(51) Int. Cl.
*F16F 1/02* (2006.01)
*B65G 19/22* (2006.01)
*F16F 1/18* (2006.01)
*F16F 3/12* (2006.01)
*F41B 5/12* (2006.01)

(58) Field of Classification Search
USPC ...... 267/28, 30, 33, 166, 286, 289, 290, 272
See application file for complete search history.

(56) References Cited

FOREIGN PATENT DOCUMENTS

| CN | 201167161 Y | 12/2008 |
|---|---|---|
| CN | 201293061 Y | 8/2009 |
| CN | 201723631 U | 1/2011 |
| CN | 201775210 U | 3/2011 |
| CN | 202934473 U | 5/2013 |
| CN | 103244587 A | 8/2013 |
| DE | 17 79 251 U | 12/1958 |
| GB | 471890 A | 9/1937 |
| GB | 1218383 A | 1/1971 |
| JP | H09296837 A | 11/1997 |
| JP | 2000274469 A | 10/2000 |
| JP | 2000291868 A | 10/2000 |
| JP | 2003262244 A | 9/2003 |
| JP | 2006083531 A | 3/2006 |
| JP | 2008088641 A | 4/2008 |
| JP | 2009 019727 A | 1/2009 |
| WO | WO 2007/136329 A1 | 11/2007 |

OTHER PUBLICATIONS

First Office action issued on Aug. 29, 2014, in parallel Chinese Application No. 201310212877.2 (with English Translation); 15 pages.
Communication with Extended European Search Report issued in parallel EP Application No. 14808196; date of mailing Mar. 16, 2017; 10 pages.

* cited by examiner

ELASTIC MEMBER, AND ELASTIC STRUCTURAL MEMBER CAPABLE OF IMPLEMENTING BEARING CAPABILITY COMBINING RIGIDITY AND FLEXIBILITY

CROSS-REFERENCE TO RELATED APPLICATION(S)

This application is a National Phase entry of PCT Aplication No. PCT/CN2014/078142, filed May 22, 2014, which application claims the benefit of priority to Chinese Patent Application No. 201310212877.2 titled "ELASTIC STRUCTURAL MEMBER HAVING GEOMETRICAL CONFIGURATION FORMED BY PASS-THROUGH TYPE CURLING", filed with the Chinese State Intellectual Property Office on Jun. 2, 2013, both of which are incorporated herein by reference in their entireties.

TECHNICAL HELD

The present application relates to the technical field of buffer devices, and particularly to an elastic member in a buffer system. The present application further relates to an elastic structural member capable of achieving bearing capability combining rigidity and flexibility.

BACKGROUND

There are many occasions in the conventional technology where a buffer member needs to be provided for buffering a load, for example, a suspension system of an automobile, a scraper in a scraper conveyor for transportation in underground coal-mining, a buffer device of a safety belt etc. Only an automobile suspension system is described below as an example.

A suspension system is a generic term of all force transmission connectors between a frame and an axle or a wheel of a vehicle such as an automobile, and is used for transmitting force and moment between the wheel and the frame, buffering impacts that transmitted to the frame or body of the vehicle from an uneven road, and absorbing shocks caused by this, so as to smooth the traveling of the vehicle.

In the conventional technology, an automobile leaf spring is a most conventional elastic element in a suspension system. Since it has advantages of high reliability, simple structure, short manufacturing process, and low cost, the automobile leaf spring has been widely used. The automobile leaf spring is generally a group of spring beams of approximately equal strengths formed by combining several sheets of alloy spring steels having various lengths.

in addition, the suspension system further includes an elastic member such as a bow-shaped leaf spring supporting frame of an automobile chassis. In practical application, the elastic member in the suspension system should not only transmit the force and moment between the wheels and the frame of the vehicle, but also buffer and absorb the shocks. Thus, a certain degree of flexibility and a certain degree of rigidity are required.

In order to address the above technical issue, the elastic member in the conventional technology is generally made of an elastic material. In a specific embodiment, the elastic member may include multiple components, and the components are laminated to each other to form a multiple layered plate-shaped structure similar to a leaf spring or are stacked to generate a certain amount of elasticity. In another embodiment, the elastic member may be configured as an elastic bent member having a certain degree of curvature or may be configured to have an arcuate structure, such as a bow shaped structure. That is to say, the conventional elastic member is generally a workpiece made of the elastic material and having a simple structure and a simple shape so as to achieve balance between rigidity and flexibility.

However, the conventional elastic member must be preferably made of an elastic material, and is restricted significantly by the structure of the elastic member with regard to buffering and subjected force during bearing, which is difficult to achieve even and consistent transition and is essentially incapable of achieving balance between rigidity and flexibility.

Hence, a technical issue to be presently addressed by the person skilled in the art is to design an elastic member which combines flexibility and rigidity, and is capable of achieving functions such as buffering and shock absorbing while providing effective load bearing.

SUMMARY

An object of the present application is to provide an elastic member which combines flexibility and rigidity, and is capable of achieving functions such as buffering and shock absorbing while providing effective load bearing.

To address the above technical issues, an elastic member is provided according to the present application, and one end of the elastic member is curled towards the other end, and passes through a body of the elastic member, and a portion being curled forms a curled portion, and portions extending from the curled portion to the two ends of the elastic member form respectively a first arm and a second arm.

One end of the elastic member according to the present application is curled towards the other end, and passes through the body of the elastic member. The portion being curled forms the curled portion, thus the curled portion pre-stores deformation of a material to accumulate elastic capability of the material, and particularly to accumulate weak elastic capability of a rigid material, thereby obtaining a higher elastic bending moment, and achieving functions of buffering and shock absorbing while providing load bearing. For a flexible material, one end of the elastic member passes through the body of the elastic member to form the curled portion, and the two ends may be restricted by means of the curled portion, so as to increase the rigidity of the flexible material, and reduce randomness of deformation thereof, thus combining the flexibility and rigidity. The load is buffered by inherent nature of the flexible material, which reduces shocks, thereby achieving reliable support to the vehicle body by reasonably configuring the structure.

As described, whatever a rigid material or a flexibility material is adopted, the elastic member according to the present application is capable of combining rigidity and flexibility, which not only can bear the load effectively, but also has good buffering and shock absorbing performance.

Preferably, the elastic member further includes a buffer member configured to adjust the curling deformation of the curled portion.

It may further provide the buffer member for adjusting the curled portion, so as to redistribute rigidity and flexibility of the elastic member without modifying the curled structure, which better adapts the application requirements, and simplifies the manufacturing process.

Preferably, the buffer member includes a rubber element disposed in a hollow region of the curled portion, and the elastic performance of the rubber element is fully utilized, so as to enhance the effects of buffering and shock absorbing, and it may further reinforce the rigidity of the curled portion.

Preferably, the buffer member includes a spring, and two ends of the spring are connected to the first arm and the second arm respectively, so as to tension the first arm and the second arm inward and further position the two arms.

The spring may be positioned by tensioning inward the first arm and the second arm, which improves the reliability of the connection between the two arms. Also, in the case that the first arm and the second arm are relatively stable, the curled portion may maintain the effectiveness of the curled structure thereof, which allows the elastic member according to the present application to have a relatively high structural stability. Employing the spring as the connecting member further enables relative movement to be generated between the first arm and the second arm, so as to adjust the performance of rigidity and flexibility of the entire elastic member.

Preferably, one end of elastic member is curled multiple times and successively towards the other end, and each curling passes through the body of the elastic member, so as to form multiple curled portions connected in turn between the first arm and the second arm.

Multiple curled portions may further be provided between the first arm and the second arm, and the various curled portions are connected in turn, thus corresponding number of curled portions may be provided by comprehensively considering the situations such as the magnitude and distribution of the load to be born, and the connection requirement of the vehicle body, so as to meet the requirements of load bearing and buffering.

Preferably, the multiple curled portions are symmetrically distributed with respect to a center line of the elastic member.

In general situation, the vehicle body is configured symmetrically in an extending direction of the vehicle body, and the curled portion can be arranged symmetrically, so as to better meet the requirements of the bearing and connection of the vehicle body.

Preferably, the curled portions at the same side of the center line are different from each other. Since the deformation energy stored by different curled portions may be different, different curled portions may be provided, so as to facilitate mutual cooperation between various curled portions and meet the ultimate application requirements.

Preferably, the multiple curled portions are different from each other.

Preferably, at least one curled portion in the multiple curled portions is curled spirally.

The curled portion may only curl one circle to form a single curling structure, or the curled portion may curl two circles or multiple circles to form a structure nested by multiple circles or a curled structure similar to a spiral shape, thus accumulating more deformation amount, and strength may be increased by curling multiple circles, which achieves bearing a large load.

Preferably, the first arm and the second arm are different in size, and each of which has a bearing end.

The first arm and the second arm may be configured to have same size, and may also be configured to have different sizes, so as to make an adjustment according to the requirements, which allows the two arms to meet the requirements such as buffering and loading of a corresponding load to be born, and avoid local stress concentration.

Preferably, the end of the first arm and/or the end of the second arm is/are curled inward to form the bearing end.

Preferably, the curled portion is provided with a connecting position configured to connect a safety belt, and the bearing end is configured to support a human body. That is the elastic member according to the present application may be used as a buffer component of a safety belt, and the human body is born by the bearing end of the first arm and the second arm during falling down, which reduces the impacts to the human body.

Preferably, the body of the elastic member is provided with an insertion opening for one end of the elastic member to pass through, and a first stopper capable of abutting against the insertion opening is provided in the curled portion;

and/or a second stopper capable of abutting against an outer wall of the curled portion is provided outside the curled portion.

Preferably, the first stopper is a stopper blocker in cooperation with an end face of the insertion opening; and the second stopper has a braking curved surface fitting against an outer wall of the curled portion.

It may further provide a first stopper and/or a second stopper, and in the case that a large deformation is generated in the curled portion under an external load, the stopper may stop and position effectively, avoiding failing of the structure of the curled portion, which increases the stability of its structure.

Preferably, the elastic member is made of a rigid material.

Preferably, the elastic member is a crossbow, and the first arm and the second arm have connecting ends configured to connect a bowstring.

Preferably, the elastic member is a scraper of a scraper conveyor, and the first arm and the second arm have ends for scraping coals, and the body of the elastic member is provided with a connecting hole for a transmission chain to pass through.

Furthermore, in view of the defects of too much elasticity and insufficient rigidity, and being hard to support the load effectively in the above conventional elastic structure made of elastic materials, it is further provided an elastic structural member made of a rigid material or an elastic material capable of achieving bearing capability combining rigidity and flexibility according to the present application.

In order to address the above technical issues, the technical solutions according to the present application are described as follows.

With the geometrical configuration of the structural member formed by pass-through type curling, the structural member itself may generate large or relatively large elastic deformation, which has no relationship with the elastic capability of the material (or it may have a relationship with the elastic capability of the material). Also, this kind of elastic structural member does not include part of structural members of spring type which are only subjected to an axial compression load, which mainly refers to the elastic structural member whose structure is curved and deformed during bearing a load of bending moment (as shown in FIG. 1), and is commonly used at an interface or joint portion of a structure, and may also be a structural member which forms an integral unit, and may also be a "core skeleton" of a structural member of this part which is wrapped with other materials externally or generates other structures.

This is a non-conventional elastic structural member. Its principle is as follows. With the geometrical configuration of the structure formed by pass-through type curling, and mainly with the pre-deformation stored, and the elastic capabilities of various materials accumulated, particularly the weak elastic capability of the rigid material accumulated in this part (the scope of dotted lines indicated by circle A in FIG. 1), the elastic structural member is enabled to achieve bearing capability combining rigidity and flexibility, and the geometrical configuration of the structure formed by pass-through type curling and the size of the structure have no relationship with the size of the space for passing through, which allow the structure to have characteristics of an irregular shaped structural member which approximately fully adapts a suffered force.

Preferably, the structural member has a geometrical configuration formed by single pass-through type curling.

Preferably, the structural member has a geometrical configuration formed by successive pass-through type curling.

Preferably, the structural member has a geometrical configuration formed by successive, variously sized, repeated, pass-through type curling.

Preferably, the structural member has a geometrical configuration formed by pass-through type curling with a rigidity stopper or a flexible braking device.

Preferably, the structural member has a geometrical configuration formed by pass-through type curling, with the size of which not is influenced by the size of the space for passing through, and the structural member has any irregular structural shape which fully adapts a suffered force.

Preferably, the structural member is a rigid material, for example, a non-metallic material.

Compared with the conventional technology, the elastic structural member has the following advantages.

1. The elastic structural member has wider options on material mechanics performance, which may significantly broaden material employment scope of the elastic structural member. That is, an elastic material may be employed, and various rigid materials which have large elastic modulus may also be employed; that is, not only the metallic material but also non-metallic material may be employed.

2. Optimized design idea of structural application and employment are broadened, which provides a way easily balancing and easily achieved for the structure to have the bearing function characteristics of combining rigidity and flexibility. For example, an elastic bracket, a flexible cantilever, a flexible kinetic energy absorbing structure (absorber), a scraper, an elastic clip, a damper, etc.

3. The situation that flexible design of overall structure is restricted by uncertainty of a static instable system is improved.

4. The characteristics of approximately fully adapting a suffered force may facilitate largely removing of the redundant mass of the structural member, which reduces the weight, and saves the energy.

Figure 1:
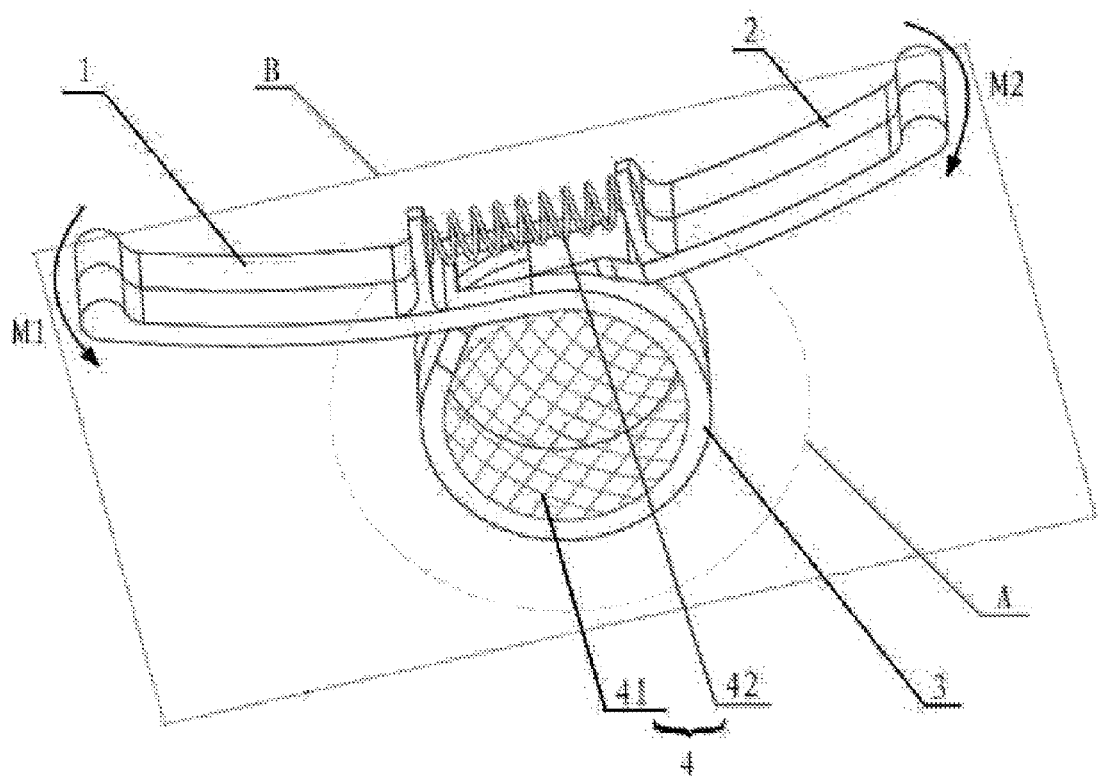
FIG. 1 is a perspective schematic view showing the structure of an elastic member according to a first embodiment of the present application.

Reference numerals in FIGS. 1 to 5:

| 1 first arm, | 11 insertion opening, | 2 second arm, |
|---|---|---|
| 3 curled portion, | 4 buffer member, | 41 rubber element, |
| 42 spring, | 5 first stopper, | 6 second stopper. |

DETAILED DESCRIPTION

An object of the present application is to provide an elastic member which is capable of combining flexibility and rigidity and achieving functions of buffering and shock absorbing while providing effective load bearing.

For the solutions of the present application to be better understood by the person skilled in the art, the present application is further described in detail hereinafter in conjunction with drawings and embodiments.

Reference is made to FIG. 1, which is a perspective schematic view showing the structure of an elastic member according to a first embodiment of the present application.

The elastic member according to the present application can be used in a suspension system of a vehicle for achieving connection between a frame and an axle or a wheel of the vehicle, such that a vehicle body is supported, an impact load during movement of the vehicle body is buffered, shocks and noise of the vehicle body are reduced, and so on.

As shown in FIG. 1, the elastic member according to the present application has two ends oppositely arranged, and one of the two ends is curled towards the other, and passes through a body of the elastic member after being curled, and then a portion formed by being curled forms a curled portion 3, and portions extending from the curled portion 3 respectively to the two ends of the elastic member form two connecting arms, which are respectively a first arm 1 and a second arm 2. The first arm 1 and the second arm 2 are configured to connect the vehicle body, so as to transmit load of the vehicle body to the frame or the wheel of the vehicle.

The body of the elastic member means a part of the elastic member with the two ends of the elastic member removed. Apparently, the body of the elastic member is a term relative to the two ends of the elastic member.

One end of the elastic member leads an arm body connected therewith to curl, till the body of the arm body is passed through, which forms a curled portion 3, as shown in FIG. 1.

It is to be noted that, the terms representing sequence, such as first, second, mentioned herein is only for distinguishing different structures, which do not mean a listed sequence. One end of the elastic member being curled towards the other end means the two ends being curled with respect to each other and finally the curled portion 3 is formed. It is not limited to the situation that one end is fixed, and the other end is curled towards the other end. That is to say, two ends of the elastic member may be curled with respect to each other to allow the two ends to pass through the body of the elastic member in a crossing manner. The specific form of curing is not limited as long as the crossing and passing through of the two ends can form the curled portion 3. The curled portion 3 formed by crossing of the above first arm 1 and the second arm 2 can be defined as a pass-through type curled structure.

The elastic member according to the present application has one end being curled towards the other end and passing through the body thereof to form the curled portion 3, i.e., the portion of circle A shown in FIG. 1, which stores and accumulates the elastic capability of a material, especially a weak elastic capability of a rigid material by curling and deformation, thereby achieving large elastic bending moment. For a flexible material, the cross-connection of the first arm 1 and the second arm 2 may restrict the material in a certain degree, so as to store the elastic capability of the material by the curled portion 3, thus reducing the randomness of the material deformation, improving the rigidity of the material, and bearing the load better.

When being employed in load bearing, the elastic member according to the present application can buffer the load via the curled portion 3 and absorb the shocks. The first arm 1 and the second arm 2 generate rotation bending moments under the load, as indicated by the arrows in FIG. 1. An outer end of the first arm 1 generates a bending moment M1 for rotating downwards in an anticlockwise direction with respect to the curled portion 3 under the load; and an outer end of the second arm 2 generate a bending moment M2 for rotating downwards in a clockwise direction with respect to the curled portion 3 under the load. Since the directions of the bending moment M1 and the bending moment M2 are respectively opposite to the directions of bending moments pre-stored in the curled portion 3, the curled portion 3 may counteract part of the bending moment M1 and the bending moment M2, so as to reduce the deformations of the first arm 1 and the second arm 2, thus improving the using performance of the material, and better buffering and absorbing the shocks while providing effective load bearing, enabling the elastic member to have bearing capability combining rigidity and flexibility.

As described, the elastic member according to the present application enables the elastic bending moment of the curled portion 3 to always act on a bearing surface B of the entire elastic member through the pass-through structure of its own, so as to restrict the elastic deformation direction of the material, thus integrating more elastic capability for bearing the load, improving the utilization rate of the material, allowing the stressed bearing state and the elastic deformation to be in a stable state, and improving the stability of load bearing.

Further, the present application may further include a buffer member 4 to adjust the curling and deformation of the curled portion 3, so as to adapt load bearing requirements from different loads.

The curled portion 3 forms a hollow region by curling and enclosing of the arm bodies, as shown in FIG. 1, the buffer member 4 may include a rubber element 41, such as a silicon rubber element, disposed in the hollow region. The buffer member 4 may further include a spring 42 and two ends of the spring 42 are respectively connected to the first arm 1 and the second arm 2, so as to tension the two arms inward and further position the two arms. That is to say, the spring 42 is in a stretched and deforming state, thus generating an elastic deforming force by retracting inward, which allows the first arm 1 and the second arm 2 to maintain a relative stable state and further position the both arms.

The buffer member 4 itself, such as the rubber element 41 and the spring 42, has a certain elastic capability, which may adjust the elastic capability of curled portion 3, so as to readjust the rigidity and flexibility characteristics of the elastic member and adjust the stress state of the elastic member during load bearing, better meeting the load bearing requirements.

Figure 2:
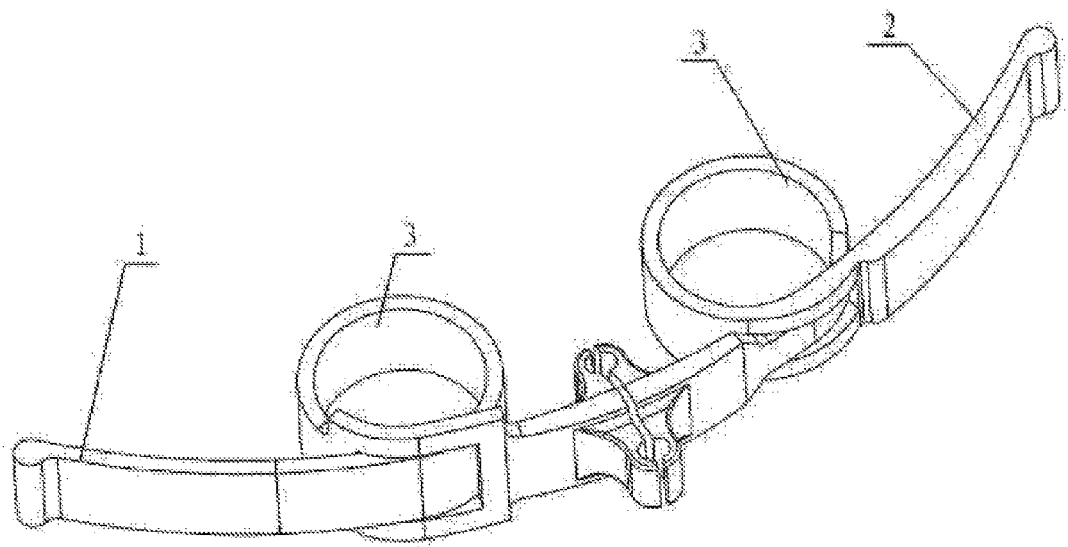
FIG. 2 is a perspective schematic view showing the structure of an elastic member according to a second embodiment of the present application.

Reference is further made to FIG. 2, which is a perspective schematic view showing the structure of an elastic member according to a second embodiment of the present application.

Multiple curled portions 3 can be formed between the first arm 1 and the second arm 2, and the multiple curled portions 3 are connected in turn, thus the first arm 1 and the second arm 2 are connected together, as shown in FIG. 2. Specifically, one end of elastic member may be curled by multiple times successively around the other end thereof, and each curling passes through the body of the elastic member. That is, the multiple curled portions 3 are provided between the first arm 1 and the second arm 2, and the multiple curled portions 3 are connected in turn along an extending direction of the elastic member, so as to form a serially connected structure, and each of the multiple curled portions 3 is a pass-through type curled structure.

For sake of brevity, only the first arm 1 and the second arm 2 and the curled portions 3 directly connected to the first arm 1 and the second arm 2 are shown in FIG. 2, and other curled portions 3 between the first arm 1 and the second arm 2 are not shown. Thus sectioning lines are adopted to represent the curled portions 3 between the first arm 1 and the second arm 2, which indicates that there may be multiple curled portions 3 between the first arm 1 and the second arm 2.

Further, the multiple curled portions 3 may be symmetrically distributed with respect to a center line of the elastic member. The center line of the elastic member refers to an axis passing through the midpoint of the elastic member in a plane perpendicular to the elastic member. The curled portions 3 may be symmetrically distributed on both sides of the center line of the elastic member, which allows the elastic member to maintain approximate characteristics in the directions towards the first arm 1 and close to the second arm 2, and bear and distribute the load evenly.

In addition, if there is no particular explanation, the term of inward and outward herein take the center line of the elastic member as a reference, and the direction close to the center line is described as inward, and the direction away from the center line is described as outward.

Furthermore, the curled portions 3 at the same side of the center line may be same, and may also be different. Same reference factors include a shape of the structure, and also include size parameters such as a volume size, a wall thickness of the curled portion. As long as one of the size parameters in two curled portions 3 is different, the two curled portions 3 are different. The elastic member according to the present application may be provided with the curled portions 3 according to application requirements and further adjust the elastic capability of the elastic member to adapt load bearings in different conditions. More importantly, since the elastic member may be provided with curled portions 3 according to application requirements, the structural shape, the geometrical size of the entire elastic member may be provided according to requirements, and the structural shape and size of the entire elastic member are variable. Such variable structure can meet the application requirements for different spaces, which allows the elastic member not to be affected by the size of the space for passing through.

Furthermore, in the case that there are multiple curled portions 3 between the first arm 1 and the second arm 2, the multiple curled portions 3 may also be different. That is, the structures of the curling spaces formed by curling of the multiple curled portions 3 may be different, or the curling spaces may be different in size, or the curling spaces may be different in both structure and size, and it may be configured specifically according to actual load bearing requirements.

The "multiple" herein refers to an uncertainty number, but at least three.

Based on the above, the first arm 1 and the second arm 2 may be different in size, and each of which may be provided with a bearing end for connecting the vehicle body, so as to support the vehicle body, and transmit the load to the frame or the wheel of the vehicle.

The first arm 1 and the second arm 2 having different sizes may refer to have different thicknesses, as shown in FIG. 2. The thickness of the wall of the second arm 2 is larger than the thickness of the wall of the first arm 1, or the thickness of the wall of the second arm 2 may be larger than or smaller than the thickness of the curled portion 3, i.e., the thickness of the wall of the entire elastic member may be configured to be gradually varied in an extending direction of the elastic member, or the size parameters such as the thickness of the wall, the length, the width of the elastic member may be varied according to load bearing requirements.

Figure 3:
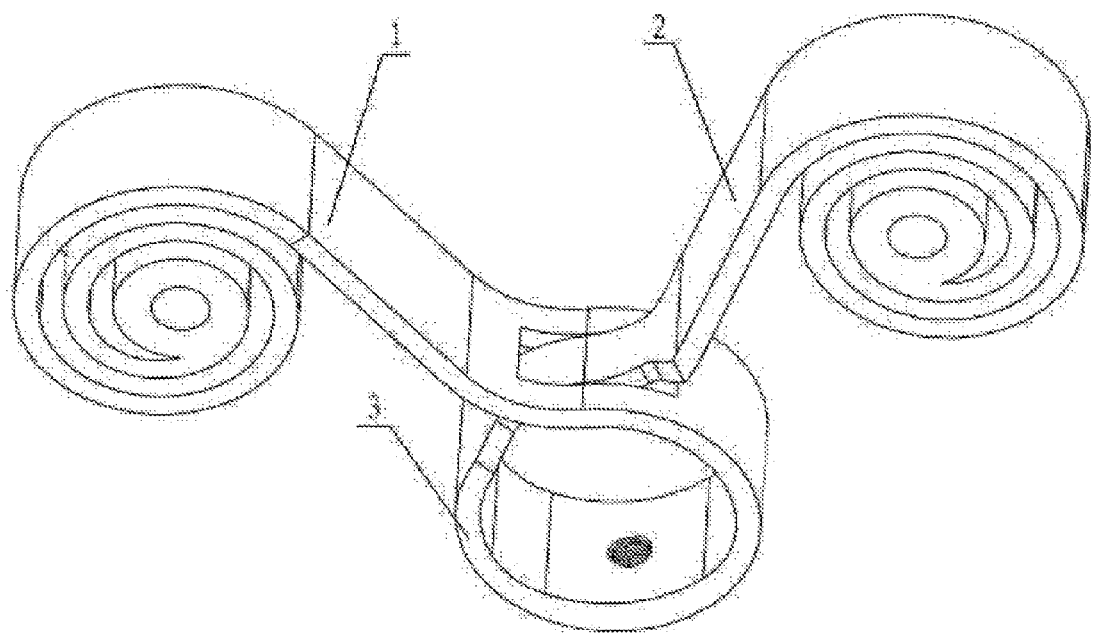
FIG. 3 is a perspective schematic view showing the structure of an elastic member according to a third embodiment of the present application.

Reference is further made to FIG. 3, which is a perspective schematic view showing the structure of an elastic member according to a third embodiment of the present application.

The end of the first arm 1 may be curled inward, and the end of the second arm 2 may also be curled inward, so as to form a spiral-shaped curled structure, and the spiral-shaped curled structure forms the bearing end, as shown in FIG. 3. The bearing end may be configured as the spiral-shaped curled structure, which improves its rigidity and facilitates effective supporting the load.

In application, the bearing ends of the first arm 1 and the second arm 2 may be connected to the vehicle body, and the first arm 1 and the second arm 2 may be connected to the frame or the wheel of the vehicle, so as to transmit the load of the vehicle body to the wheel or the frame of the vehicle.

Or, the elastic member according to the present application may act as a buffer device of a safety belt, and the curled portion 3 is provided with a connecting position for connecting to the safety belt, which facilitates the elastic member mounting to the safety belt. Then the bearing ends of the first arm 1 and the second arm 2 are arranged to face towards a human body. When the human body falls down, the human body contacts the bearing ends of the first arm 1 and the second arm 2 firstly, and the gravity of the human body acts on the elastic member. The impacts generated by gravity may be buffered by the spiral-shaped curled structure of the bearing ends and the curled portion 3, so as to reduce the damage to the human body.

Figure 4:
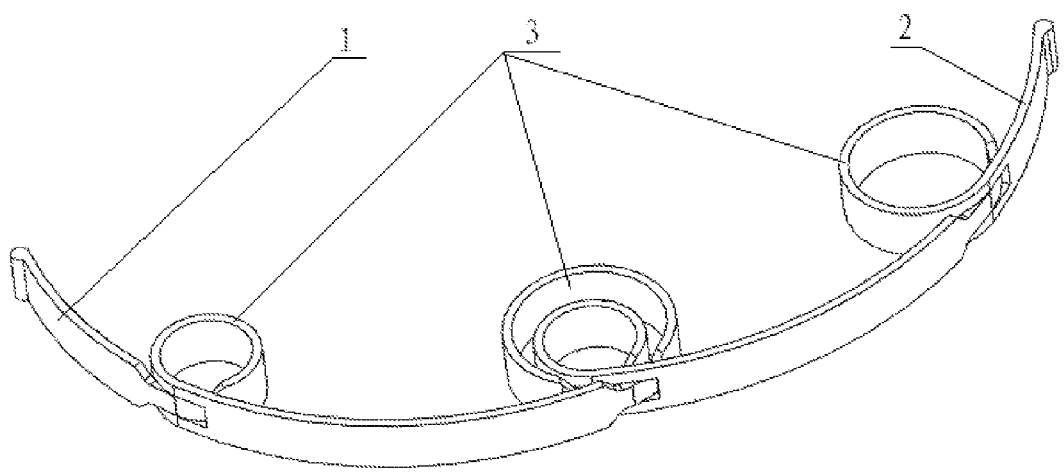
FIG. 4 is a perspective schematic view showing the structure of an elastic member according to a fourth embodiment of the present application.

Reference is made to FIG. 4, which is a perspective schematic view showing the structure of an elastic member according to a fourth embodiment of the present application.

in the multiple curled portions 3, at least one curled portion 3 may be curled in a spiral shape, i.e., the curled portion 3 may have a structure in which two or more curled circles are nested with each other. In the structure shown in FIG. 4, the curled portion 3 in the middle may include two curled circles nested with each other, or in other words the curled portion 3 may be configured as a structure which is curled spirally, and the elastic deformation stored by the curled portion 3 is adjusted by varying the structure of the curled portion 3, so as to adapt bearings of various loads.

Figure 5:
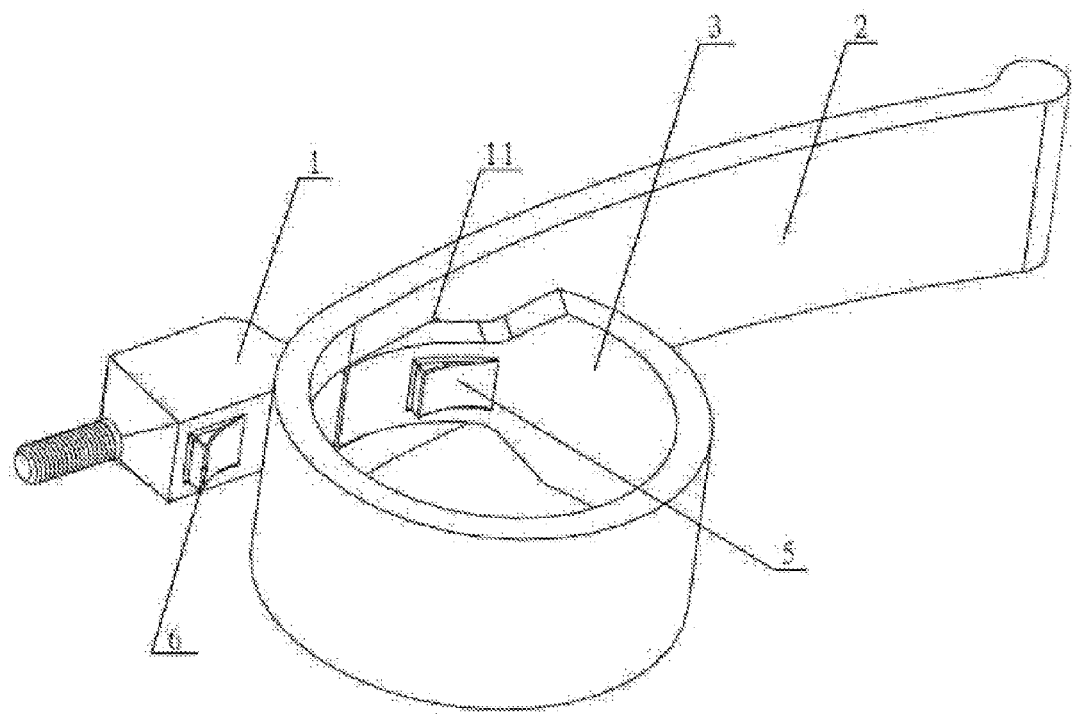
FIG. 5 is a perspective schematic view showing the structure of an elastic member according to a fifth embodiment of the present application.

Reference is made to FIG. 5, FIG. 5 is a perspective schematic view showing the structure of an elastic member according to a fifth embodiment of the present application.

The elastic member according to the present application may be provided with an insertion opening 11 for one of its ends to pass through, as shown in FIG. 5. The elastic member may further be provided with a first stopper 5. The first stopper 5 is arranged inside the curled portion 3, i.e., close to the center portion of the curled portion 3, and the first stopper 5 is capable of abutting against the insertion opening 11, so as to secure the curled structure of the curled portion 3 and prevent it from being excessively deformed. Similarly, the elastic member may further be provided with a second stopper 6. The second stopper 6 is arranged on an external portion of the curled portion 3, and is capable of fitting and abutting against an outer wall of the curled portion 3, so as to prevent the arm body of the first arm 1 or the second arm 2 from passing through the insertion opening 11, and maintain the effectiveness of the structure of the curled portion 3.

Specifically, the first stopper 5 may be a stopper blocker in cooperation with an end face of the insertion opening 11, and the end face of the stopper blocker may be blocked on the end face of the insertion opening 11, so as to prevent the end portion of the curled portion 3 from passing through the insertion opening 11 to extend outwards. The second stopper 6 may have a braking curved surface fitting against an outer wall of the curled portion 3, and as the curled portion 3 is deformed, the braking curved surface of the second stopper 6 gradually fits and abuts against the outer wall of the curled portion 3, so as to prevent the curled portion 3 from continuing to be deformed, which maintains the effectiveness of the structure of the curled portion 3.

Thus, the first stopper may be acted as a rigid stopper, which can contact and connect with the end face of the insertion opening 11 instantly, so as to prevent the deformation of the curled portion 3. The second stopper 6 may be acted as a flexible stopper, and the braking curved surface of the second stopper may slowly contact the outer wall of the curled portion 3, and gradually restrict the deformation of the curled portion 3 first, which finally prevents the deformation of the curled portion 3 at the end. The first stopper 5 may be cooperated with the second stopper 6, so as to improve the stability of the structure of the curled portion 3, and further improve the using performance of the elastic member.

It is to be appreciated by the person skilled in the art that, the elastic member according to the present application may be made of a flexible material, and it may also be made of a rigid material, that is, each of the first arm 1 and the second arm 2 and the curled portion 3 may be made of a rigid material. The rigid material may be a non-metallic material, to accumulate the elastic deformation capability of the rigid material, so as to allow the flexibility and rigidity of the elastic member to be balanced, and further achieve the effect of combining rigidity and flexibility.

It is further to be appreciated by the person skilled in the art that, the parameter, such as the structure and/or size of the first arm 1, the second arm 2, and/or and the curled portion 3, of the elastic member according to the present application may be varied according to load bearing requirements, which is not limited to the form shown in FIG. 1 to 5, so as to change the flexibility and rigidity of the elastic member and enable it to have better using performance.

It is to be noted that, the elastic member according to the present application may be applied in any system which requires buffer, and is not limited to the above buffer device, such as suspension system or the safety belt. The structures of the first arm 1 and the second arm 2 may also be configured according to specific application situations of the elastic member, and is not limited to be provided with the bearing ends.

For example, the elastic member according to the present application may also be applied in a scraper conveyor for transportation in underground coal mining. The scraper conveyor is a conveyor for conveying bulk materials in a chute through a scraper being draught by a transmission chain. The elastic member according to the present application may be used as the scraper of the scraper conveyor.

Specifically, the first arm 1 and the second arm 2 may be provided with ends for scraping coals to form scraping ends. A connecting hole for the transmission chain to pass through may also be provided in the body of the elastic member, so as to secure the elastic member to the transmission chain and further form a scraper chain, then the elastic member (the scraper) can be moved during the moving of the transmission chain, which allows the coals to move along the chute with the scraping ends the first arm 1 and the second arm 2.

When being as the scraper, the elastic member is generally made of a rigid material. In practical, the track of the scraper conveyor is not in a precise straight line and may have turning and twisting, thus when the scraper runs to turned portion, the scraping ends of the first arm 1 and the second arm 2 may bear alternating loads or loads with large fluctuation, the elastic deformation pre-stored in the curled portion 3 may then buffer the loads, so as to reduce wearing or colliding of the scraper itself, and prolong the service life of the scraper.

The elastic member according to the present application may further act as a crossbow for military purpose. The first arm 1 and the second arm 2 have connecting ends for connecting a bow-string, and the entire elastic member may be provided with one to three curled portions 3, and the entire elastic member is configured to be of a bow shape. The curled portions 3 itself pre-stores large elastic deformation, and when it is used as a crossbow, greater elastic restoring force may be generated under a certain tension, which improves the range of shooting and lethality of the crossbow. Also, the elastic member has a simple structure, and has advantages of small weight, easy to be transported and manufactured, and so on.

In the case that the elastic member is applied in other situations, its specific structure may be configured with reference to the situation in which the elastic member is used in the suspension system, which is not further described here.

As described, the elastic member in the present application may be applied in any system which requires to be buffered. The first arm 1 and the second arm 2 may be provided with structures, such as connecting ends and/or bearing ends, according to various application scenarios. The structure of the curled portion 3 may also be varied according to requirements, or a corresponding connecting structure may be provided on the body of the elastic member. The specific connecting structure may be arranged on the curled portion 3 or may be arranged on an arm body connecting two adjacent curled portions 3.

Furthermore, in order to make the technical solutions of the elastic structural member according to the present application more clear, the present application is further described in detail hereinafter in conjunction with the drawings and specific embodiments.

First Embodiment

This embodiment is an elastic structural member having a geometrical configuration formed by a single pass-through curling. Reference is made to FIG. 1.

The pre-deformation is stored and the elastic capability of the material, particularly the weak elastic capability of the rigid material is accumulated in the scope of the dotted line indicated by the circle A to obtain elastic bending moment, and the structure itself is of a pass-through type, thus enabling the movement stroke of the structure to be in a limited space, and the elastic deformation of the structure to be restricted in a direction, and the geometrical displacement of the structural member to be controlled, which allows the elastic bending moments M1 and M2 to always act on a structural symmetric plane B, and ensure the stressed load bearing state and the elastic deformation of the structural member to be in a stable condition, and thus the load bearing function is achieved reliably. Means for the stressed condition to be redistributed, for example, a rubber element 41, specifically a silicon rubber element, a spring 42 and so on, during the elastic deforming may be embedded and mounted in the pass-through type curling region of the structure, so as to weaken the accuracy requirements on the structure and size of the structural pass-through type curling region, and simplify the implementation of process.

Second Embodiment

This embodiment is an elastic structural member having a geometrical configuration formed by successive pass-through type curling, so as to adapt or adjust structural elastic capability required by load bearing in various dynamic states (in the implementation, this embodiment may also include a configuration capable of achieving the combination of rigidity and flexibility and even achieving rigid bearing). Reference is made to FIG. 2.

Third Embodiment

This embodiment is an elastic structural member having a geometrical configuration formed by successive, variously sized (for example, the curling structures at two sides), repeated, or spiral-shaped (for example, the curling structure in the middle) pass-through type curling, to adapt or adjust structural elastic capability required by load bearing in various dynamic states (in the implementation, this embodiment also includes a configuration capable of achieving the combination of rigidity and flexibility and even achieving rigid bearing). Reference is made to FIG. 4.

Fourth Embodiment

This embodiment is an elastic structural member having a geometrical configuration formed by pass-through type curling with a rigidity stopper and a flexible braking platform. Such structure may be set am elastic deformation degree, and may be provided with a position-limiting means for limiting deformation degree, such as a rigidity stopper 5 or a flexible braking platform 6, which may stop or slow down the continuation of the deformation, and better achieve the capabilities from combining rigidity and flexibility even to rigid bearing of the structural member. Reference is made to FIG. 5.

Fifth Embodiment

This embodiment is an elastic structural member having a single pass-through type curling and spiral-shaped geometrical configuration. Reference is made to FIG. 3.

The elastic member, the elastic structural member capable of achieving bearing capability combining rigidity and flexibility of a buffer system according to the present application are described in detail hereinbefore. In the description, specific examples are used in the description of the principle and embodiments of the present application. It is noted that the examples and the embodiments are only for better understanding of the idea of the present application. It should be noted that, various improvements and modifications can be made by those skilled in the art without departing from the principle of the present application, which also fall within the scope of protection defined by the claims.

The invention claimed is:

1. An elastic member, wherein one end of the elastic member is curled towards the other end, and penetrates a body of the elastic member, and a portion being curled forms a curled portion, and portions extending from the curled portion to the two ends of the elastic member form respectively a first arm and a second arm, and both of the first arm and the second arm are bearing arms, and the geometrical configuration and size of each of the first arm and the second arm have no relationship with the size of a space for penetrating the body of the elastic member, wherein the one end of the elastic member is curled towards the other end a plurality of times and successively, and each curling penetrates the body of the elastic member so as to form a plurality of curled portions sequentially connected between the first arm and the second arm.

2. The elastic member according to claim 1, further comprising a buffer member configured to adjust the curling deformation of the curled portion.

3. The elastic member according to claim 2, wherein the buffer member comprises a rubber element disposed in a hollow region of the curled portion.

4. The elastic member according to claim 2, wherein the buffer member comprises a spring, and two ends of the spring are connected to the first arm and the second arm respectively, so as to tension the first arm and the second arm inward and further position the two arms.

5. The elastic member according to claim 1, wherein the plurality of curled portions are symmetrically distributed with respect to a center line of the elastic member.

6. The elastic member according to claim 1, wherein the plurality of curled portions are different from each other.

7. The elastic member according to claim 1, wherein at least one curled portion in the plurality of curled portions is curled spirally.

8. The elastic member according to claim 1, wherein the first arm and the second arm are different in size, and each of the first arm and the second arm is provided with a bearing end.

9. The elastic member according to claim 8, wherein an end of the first arm and/or an end of the second arm is/are curled inward to form the bearing end.

10. The elastic member according to claim 1, wherein the body of the elastic member is provided with an insertion opening for one end of the elastic member to penetrate, and a first stopper capable of abutting against the insertion opening is provided in the curled portion; and/or a second stopper capable of abutting against an outer wall of the curled portion is provided outside the curled portion.

11. The elastic member according to claim 10, wherein the first stopper is a stopper blocker in cooperation with an end face of the insertion opening; and the second stopper has a braking curved surface fitting against the outer wall of the curled portion.

12. The elastic member according to claim 1, wherein the elastic member is made of a rigid material.

* * * * *